(12) United States Patent
Mori et al.

(10) Patent No.: US 8,187,134 B2
(45) Date of Patent: May 29, 2012

(54) FRICTION ROLLER TYPE POWER TRANSMISSION DEVICE

(75) Inventors: Atsuhiro Mori, Fujisawa (JP); Eigo Sakagami, Kawasaki (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 133 days.

(21) Appl. No.: 12/864,194

(22) PCT Filed: Jan. 20, 2009

(86) PCT No.: PCT/JP2009/050749
§ 371 (c)(1),
(2), (4) Date: Jul. 22, 2010

(87) PCT Pub. No.: WO2009/093570
PCT Pub. Date: Jul. 30, 2009

(65) Prior Publication Data
US 2010/0294613 A1 Nov. 25, 2010

(30) Foreign Application Priority Data
Jan. 23, 2008 (JP) .................. 2008-012172

(51) Int. Cl.
*F16H 1/32* (2006.01)
*F16H 3/70* (2006.01)
(52) U.S. Cl. .............. 475/165; 475/166; 475/170
(58) Field of Classification Search .......... 475/165, 475/166, 168, 170
See application file for complete search history.

(56) References Cited

U.S. PATENT DOCUMENTS

| | | | |
|---|---|---|---|
| 6,438,480 B2 | 8/2002 | Tanaka et al. | |
| 6,551,211 B2 | 4/2003 | Kanazawa | |
| 6,719,658 B2 * | 4/2004 | Haga et al. | 475/163 |
| 6,849,025 B2 | 2/2005 | Chikaraishi et al. | |
| 2002/0147068 A1 | 10/2002 | Chikaraishi et al. | |
| 2004/0198549 A1 | 10/2004 | Wafzig | |
| 2005/0143211 A1 | 6/2005 | Yamamoto | |
| 2005/0266954 A1 | 12/2005 | Yoshimura | |
| 2008/0064553 A1 * | 3/2008 | Newton | 475/165 |

FOREIGN PATENT DOCUMENTS

| | | |
|---|---|---|
| EP | 1 808 617 A1 | 7/2007 |
| JP | 2-33956 U | 3/1990 |
| JP | 2001-341539 A | 12/2001 |
| JP | 2002-87091 A | 3/2002 |
| JP | 2002-87092 A | 3/2002 |

(Continued)

OTHER PUBLICATIONS

U.S. Appl. No. 12/810,255, filed Jun. 23, 2010, Mori. U.S. Appl. No. 12/864,188, filed Jul. 22, 2010, Mori.

*Primary Examiner* — Edwin A Young
(74) *Attorney, Agent, or Firm* — Foley & Lardner LLP

(57) ABSTRACT

Under control of rotation of a crankshaft 41, a friction roller 32 is pressed against a friction roller 31 in a radial direction, so as to achieve torque transmission between the rollers 31, 32. An inter-roller radial pressing reaction is canceled as an internal force in bearing supports 23, 25, with no input to a housing 11. Each bearing support 23, 25 is formed with a constricted portion at a center section of the bearing support between bearing-fitting portions at end sections of the bearing support, for lowering support stiffness of the bearing support against the inter-roller radial pressing reaction.

11 Claims, 13 Drawing Sheets

FOREIGN PATENT DOCUMENTS

| | | |
|---|---|---|
| JP | 2002-349653 A | 12/2002 |
| JP | 2003-028251 A | 1/2003 |
| JP | 2003-247617 A | 9/2003 |
| JP | 2004-306948 A | 11/2004 |
| JP | 2005-188701 A | 7/2005 |
| JP | 2005-337442 A | 12/2005 |
| JP | 2006-132738 A | 5/2006 |

* cited by examiner

FIG.8A  FIG.8B
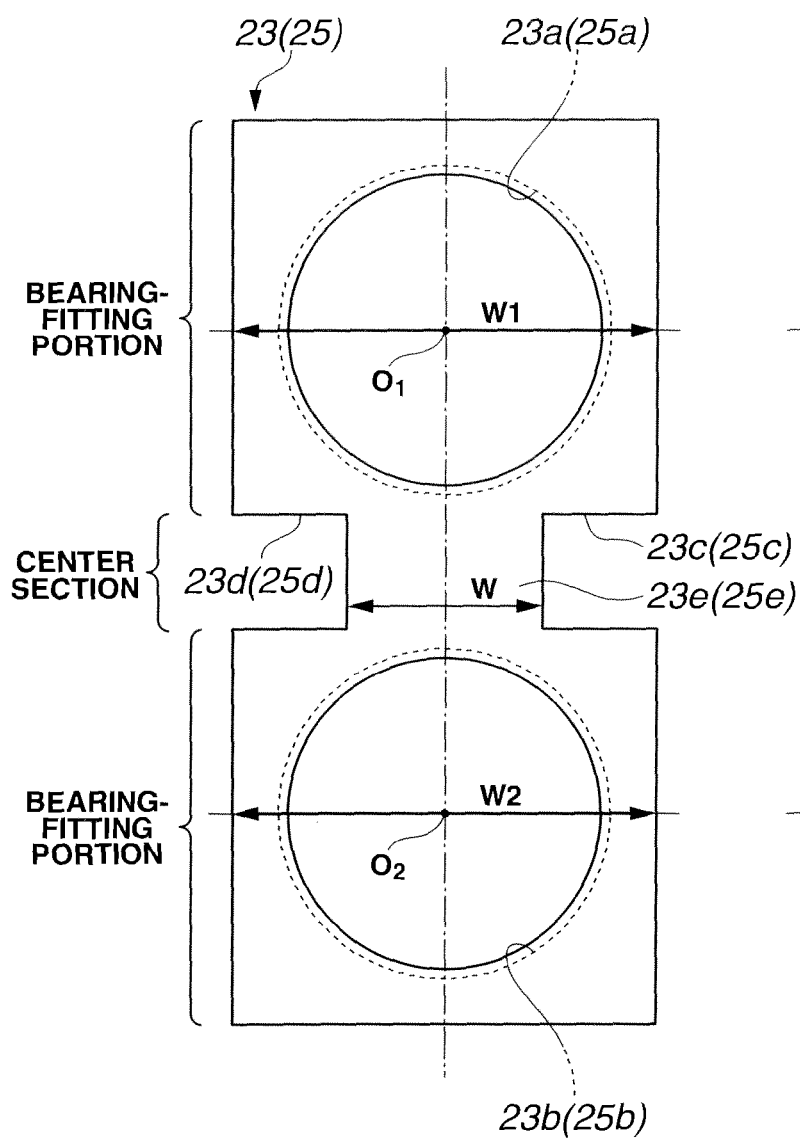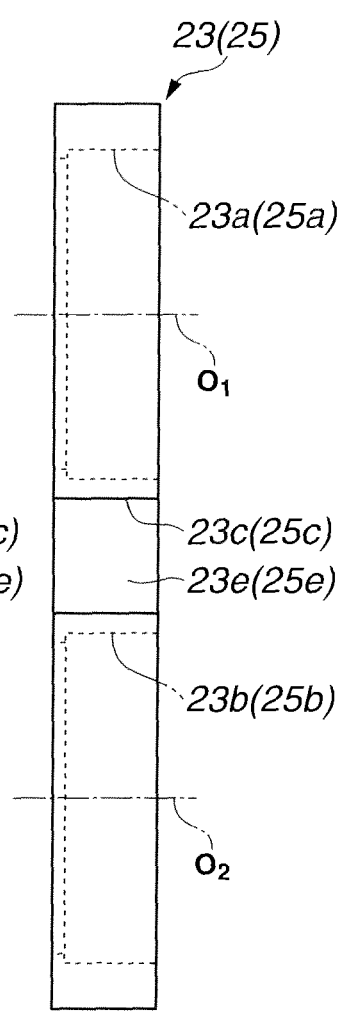

FIG.9A      FIG.9B
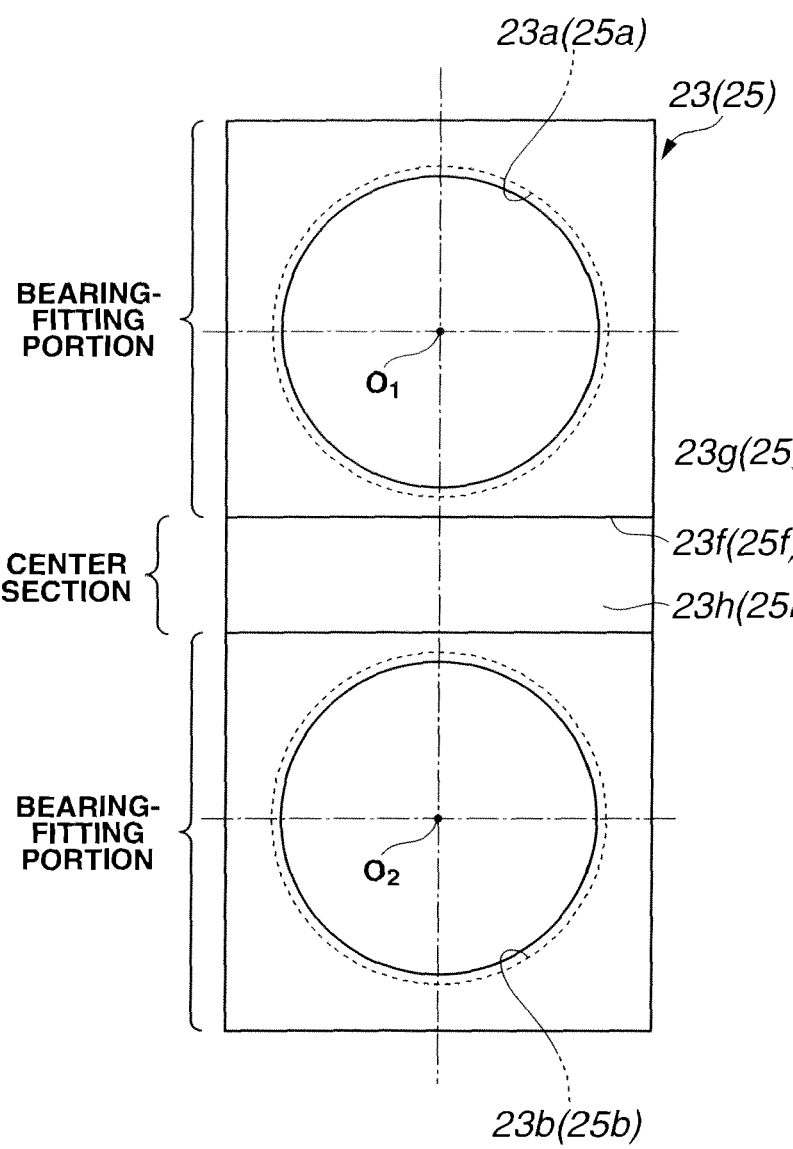
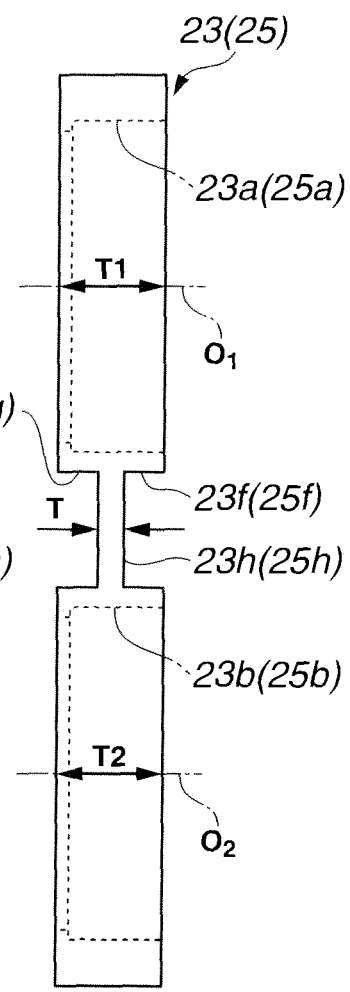

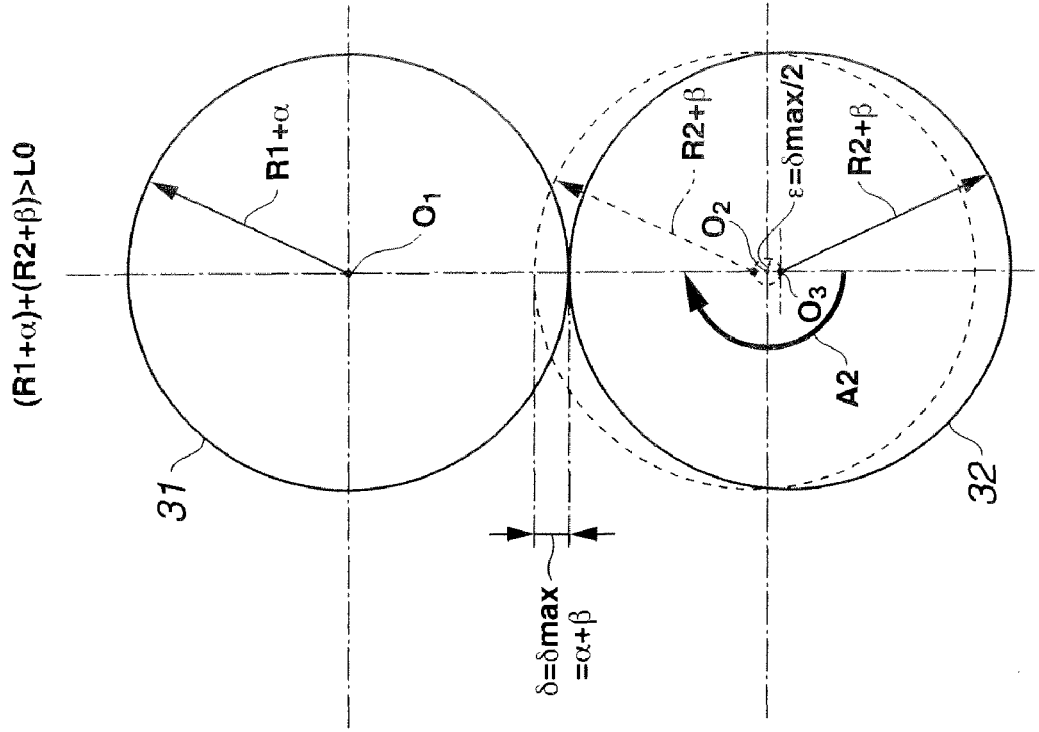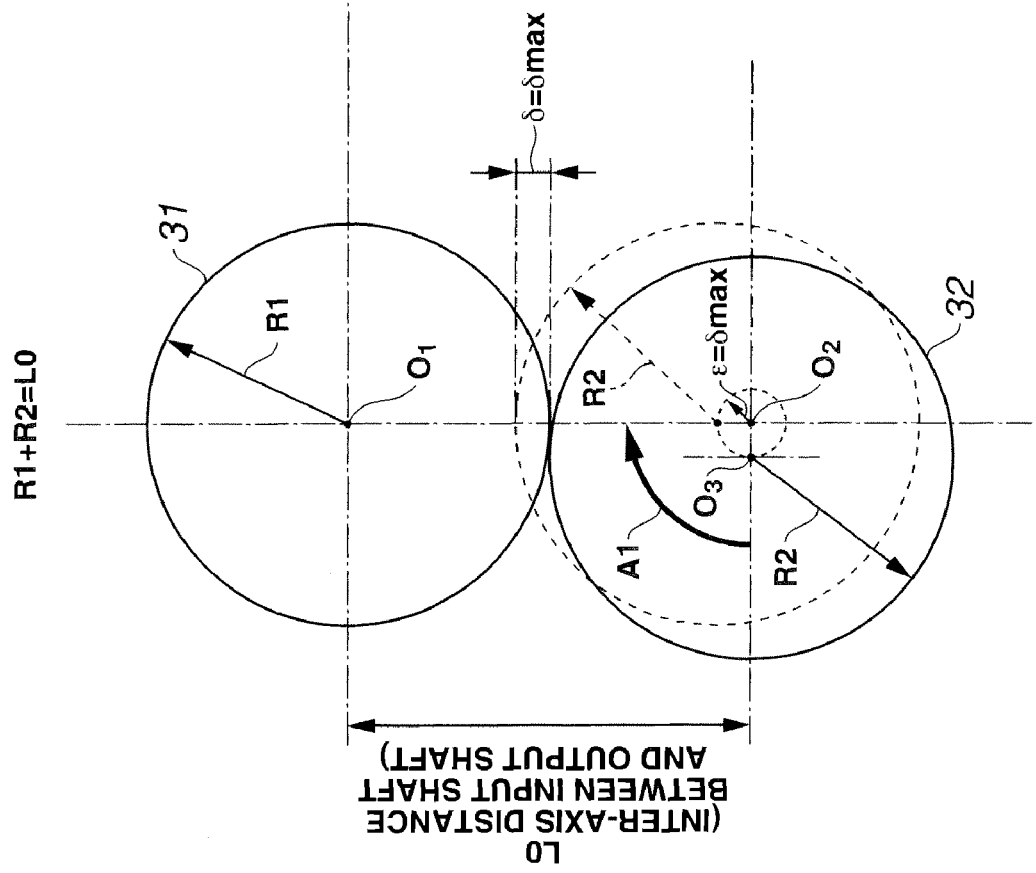

FRICTION ROLLER TYPE POWER TRANSMISSION DEVICE

TECHNICAL FIELD

The present invention relates to a friction roller type power transmission device useful as a transfer (driving force distribution device) of a four wheel drive vehicle.

BACKGROUND OF THE INVENTION

A patent document 1 discloses a commonly used transfer (driving force distribution device) of a four wheel drive vehicle. The driving force distribution device disclosed in this document is a transfer of a four wheel drive vehicle, which employs a planetary gearset, and sets driving force distribution between main and auxiliary driving wheels wherein a torque from a transmission is inputted into a carrier of the planetary gearset, and the torque is split and outputted from the carrier through a sun gear and a ring gear to the main driving wheels and the auxiliary driving wheels.
Patent Document 1: JP 2005-337442 A

SUMMARY OF THE INVENTION

In such a conventional driving force distribution device as described above, the distribution ratio between torque to the main driving wheels (main driving wheel torque), and torque to the auxiliary driving wheels (auxiliary driving wheel torque) is uniquely determined by tooth specifications (the number of teeth of the sun gear, and the number of teeth of the ring gear, for the construction of patent document 1), because the driving force distribution between the main and auxiliary driving wheels is implemented with a gearset such as a planetary gearset.

Accordingly, the distribution ratio between the main driving wheel torque and the auxiliary driving wheel torque is constant in the entire torque range, so that as the input torque to the driving force distribution device increases, the main driving wheel torque increases naturally, and the auxiliary driving wheel torque increases accordingly.

In recent years, in view of global warming and surge in fuel cost, it becomes increasingly socially important to enhance vehicle fuel efficiency. It is commonly known that vehicle weight reduction contributes effectively to enhancement of vehicle fuel efficiency. In order to achieve weight reduction of a vehicle, it is necessary to form the vehicle compact. In a four wheel drive vehicle, a driving system for auxiliary driving wheels also needs to be made compact, while the strength of the driving system is set minimal.

However, in such a conventional driving force distribution device in which the distribution ratio between main driving wheel torque and auxiliary driving wheel torque is constant in the entire torque range, so that as the input torque to the driving force distribution device increases, the auxiliary driving wheel torque increases similar to the main driving wheel torque, it is possible that the auxiliary driving wheel torque exceeds the strength of the auxiliary driving wheel driving system which needs to be made compact for the reason described above.

Therefore, there is a problem that such a conventional driving force distribution device cannot be used as a transfer of a four wheel drive vehicle whose auxiliary driving wheel driving system needs to be made compact in conformance with the requirement of compactness of the vehicle.

In consideration of the fact described above, it is a first object of the present invention to provide a friction roller type power transmission device useful as a driving force distribution device which is capable of restricting auxiliary driving wheel torque to an upper limit, and thereby solving the problem described above.

Accordingly, the present invention is based on a friction roller type power transmission device which allows power transmission between a pair of friction rollers by pressing the friction rollers against one another in a radial direction of the friction rollers into frictional contact with one another, and is targeted for: making the friction roller type power transmission device further useful by making it possible to control transmitted torque capacity by inter-friction-roller radial pressing force control; achieving weight reduction of a housing by preventing the housing from being inputted with an inter-friction-roller radial pressing reaction; and enhancing the accuracy of the inter-friction-roller radial pressing force control (transmitted torque control).

For that purpose, a friction roller type power transmission device according to the present invention is configured to allow power transmission between a pair of friction rollers by pressing the friction rollers against one another in a radial direction of the friction rollers into frictional contact with one another in one of a direct manner and an indirect manner, wherein: one of the friction rollers is supported for rotation about an eccentric axis with respect to a crankshaft whose rotational position is adapted to be controlled to adjust a radial pressing force between the friction rollers; each side of the friction rollers in an axial direction of the friction rollers is provided with a bearing support to which the crankshaft related to the one of the friction rollers, and a friction roller shaft related to another of the friction rollers are bearing-fitted, so that the bearing supports bear a radial pressing force reaction between the friction rollers; and each bearing support is formed with a constricted portion at a center section of the bearing support between bearing-fitting portions at end sections of the bearing support, for lowering support stiffness of the bearing support against the radial pressing reaction between the friction rollers.

Moreover, a friction roller type power transmission device according to the present invention comprises: a first friction roller having a rotation axis in a first direction; a second friction roller arranged to allow frictional torque transmission with the first friction roller, and positioned in a second direction from the rotation axis of the first friction roller, the second friction roller having a rotation axis substantially parallel to the first direction; a crankshaft that supports the second friction roller so as to allow the second friction roller to rotate about an eccentric axis, and changes a radial pressing force between the first and second friction rollers by rotation; and a bearing support including: a first bearing-fitting portion pivotally supporting the first friction roller; a second bearing-fitting portion pivotally supporting the crankshaft; and a center section between the first and second bearing-fitting portions, the center section having a smaller size in a direction perpendicular to the first and second directions than the first and second bearing-fitting portions.

Still moreover, a friction roller type power transmission device according to the present invention comprises: a first friction roller having a rotation axis in a first direction; a second friction roller arranged to allow frictional torque transmission with the first friction roller, the second friction roller having a rotation axis substantially parallel to the first direction; a crankshaft that supports the second friction roller so as to allow the second friction roller to rotate about an eccentric axis, and changes a radial pressing force between the first and second friction rollers by rotation; and a bearing support including: a first bearing-fitting portion pivotally supporting the first friction roller; a second bearing-fitting portion pivotally supporting the crankshaft; and a center section between the first and second bearing-fitting portions, the center section having a smaller size in the first direction than the first and second bearing-fitting portions.

BRIEF DESCRIPTION OF THE DRAWINGS

FIGS. 8A and 8B show a bearing support of the driving force distribution device (friction roller type power transmission device) shown in FIG. 2, where FIG. 8A is a front view in an axial direction of a bearing-fitting portion that is provided in the bearing support, and FIG. 8B is a side view;

FIGS. 9A and 9B show a bearing support according to another embodiment of the present invention, similar to FIGS. 8A and 8B, where FIG. 9A is a front view of the bearing support, and FIG. 9B is a side view of the bearing support;

FIG. 10A is a front view of the bearing support, and FIG. 10B is a side view of the bearing support;

FIGS. 13A and 13B are diagrams showing how to control an inter-friction-roller radial pressing force between first and second friction rollers in the driving force distribution device (friction roller type power transmission device) shown in FIG. 2, where FIG. 13A is a diagram showing how to control the inter-friction-roller radial pressing force in cases where the sum of the radiuses of the first and second friction rollers is set equal to an inter-axis distance between input and output shafts, and FIG. 13B is a diagram showing how to control the inter-friction-roller radial pressing force in cases where the sum of the radiuses of the first and second friction rollers is set greater than the inter-axis distance between input and output shafts.

DETAILED DESCRIPTION

Figure 1:
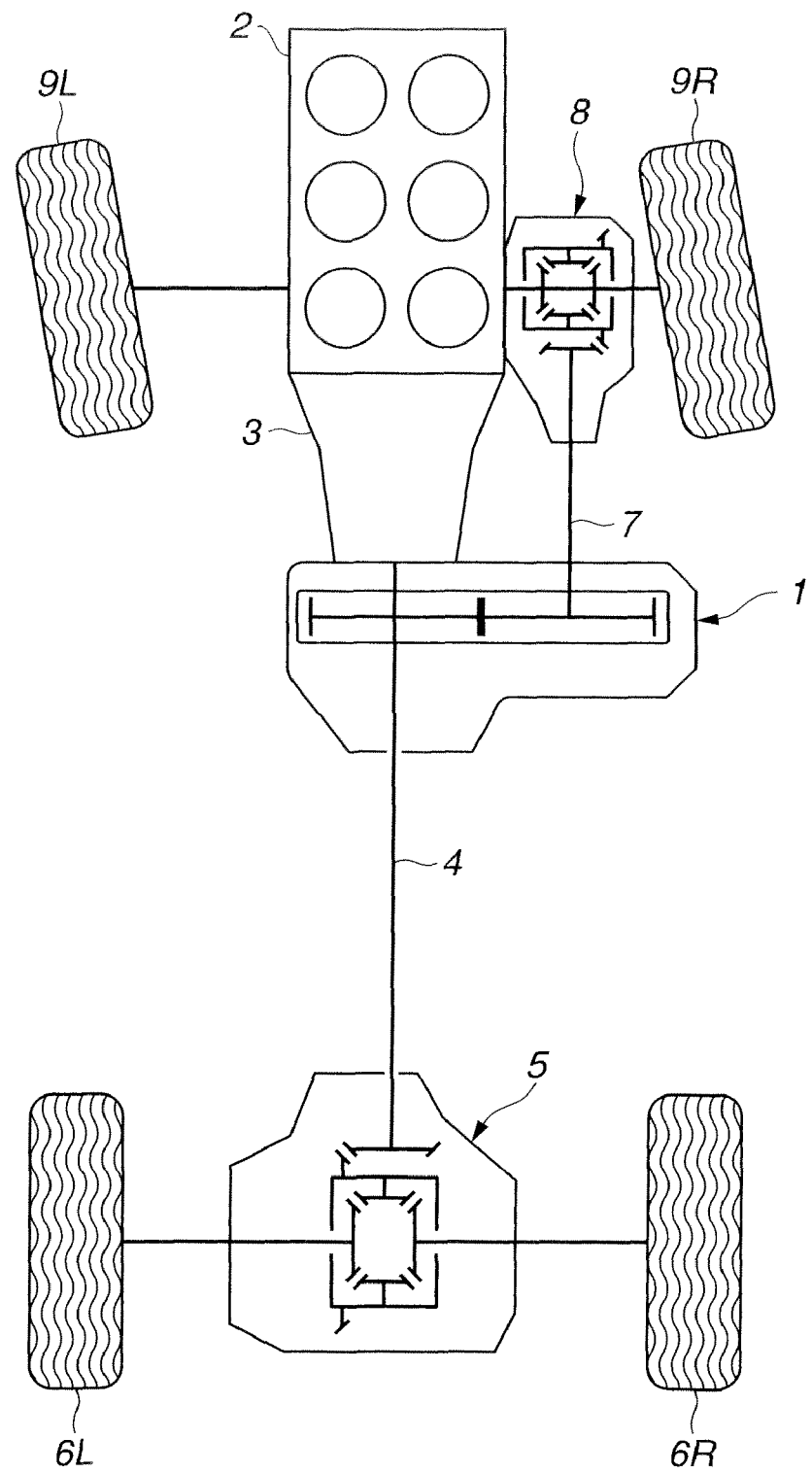
FIG. 1 is a schematic plan view from above a four wheel drive vehicle, showing a powertrain of the four wheel drive vehicle which is provided with a friction roller type power transmission device according to an embodiment of the present invention as a driving force distribution device.

In the friction roller type power transmission device according to the present invention, power transmission is implemented by frictional contact between a pair of friction rollers. Accordingly, no large torque above a range of transmitted torque capacity determined by an inter-friction-roller radial pressing force is transmitted between the rollers. When used as a driving force distribution device in a four wheel drive vehicle, the friction roller type power transmission device can restrict auxiliary driving wheel torque to an upper limit.

Accordingly, even when the input torque to the friction roller type power transmission device becomes large, the auxiliary driving wheel torque does not exceed the upper limit. Therefore, the friction roller type power transmission device according to the present invention can be used as a driving force distribution device in a four wheel drive vehicle in which an auxiliary driving wheel driving system needs to be made compact in conformance with the requirement of compactness of the vehicle.

Moreover, in the friction roller type power transmission device according to the present invention, one of the friction rollers is supported for rotation about an eccentric axis with respect to a crankshaft whose rotational position is adapted to be controlled to adjust a radial pressing force between the friction rollers. This is very useful, because the transmitted torque capacity determined by the inter-friction-roller radial pressing force can be controlled arbitrarily, to satisfy a wide variety of requirements concerning the transmitted torque capacity.

Still moreover, in the friction roller type power transmission device according to the present invention, each side of the friction rollers in an axial direction of the friction rollers is provided with a bearing support, wherein the bearing supports bear a radial pressing force reaction between the friction rollers, so as to prevent the radial pressing force reaction from being transmitted to a housing. This makes it possible to achieve weight reduction of the housing.

For the purpose described above, bearing supports, which are provided on both sides in the axial direction of first and second friction rollers 31, 32, have high support stiffness against the inter-friction-roller radial pressing reaction. Accordingly, during the inter-friction-roller radial pressing force control (transmitted torque capacity control) by the rotation angle control of the crankshaft, the inter-friction-roller radial pressing force (or transmitted torque capacity) tends to change rapidly with respect to the crankshaft rotation angle, so that the range of the crankshaft rotation angle used in the inter-friction-roller radial pressing force control (transmitted torque capacity control) is narrowly limited, which may adversely affect the accuracy of the control.

However, according to the present invention, each bearing support is formed with a constricted portion at a center section of the bearing support between bearing-fitting portions at end sections of the bearing support, for lowering support stiffness of the bearing support against the radial pressing reaction between the friction rollers. This serves to enhance the accuracy of the control, because the amount of deformation of the bearing support due to the inter-friction-roller radial pressing reaction is larger, and accordingly, the inter-friction-roller radial pressing force (or transmitted torque capacity) changes more slowly with respect to the rotation angle of the crankshaft, so that the range of the rotation angle of the crankshaft used in the inter-friction-roller radial pressing force control (transmitted torque capacity control) can be extended.

The following describes modes of carrying out the present invention, with reference to embodiments shown in the drawings. FIG. 1 is a schematic plan view from above a four wheel drive vehicle, showing a powertrain of the four wheel drive vehicle which is provided with a friction roller type power transmission device according to an embodiment of the present invention as a driving force distribution device (transfer) 1.

The four wheel drive vehicle of FIG. 1 is based on a rear wheel drive vehicle in which rotation from an engine 2 is shifted by a transmission 3, and then transmitted through a rear propeller shaft 4 and a rear final drive unit 5 to left and right rear wheels 6L, 6R, and constructed so that a part of torque to left and right rear wheels (main driving wheels) 6L, 6R is transmitted by frictional transmission of driving force distribution device 1 through a front propeller shaft 7 and a front final drive unit 8 to left and right front wheels (auxiliary driving wheels) 9L, 9R, thus achieving four wheel driving.

Driving force distribution device (friction roller type power transmission device) 1 is thus configured to set torque distribution between left and right rear wheels (main driving wheels) 6L, 6R, and left and right front wheels (auxiliary driving wheels) 9L, 9R by splitting and outputting to left and right front wheels (auxiliary driving wheels) 9L, 9R a part of torque to left and right rear wheels (main driving wheels) 6L, 6R. In this embodiment, driving force distribution device (friction roller type power transmission device) 1 is constructed as shown in FIG. 2.

Figure 2:
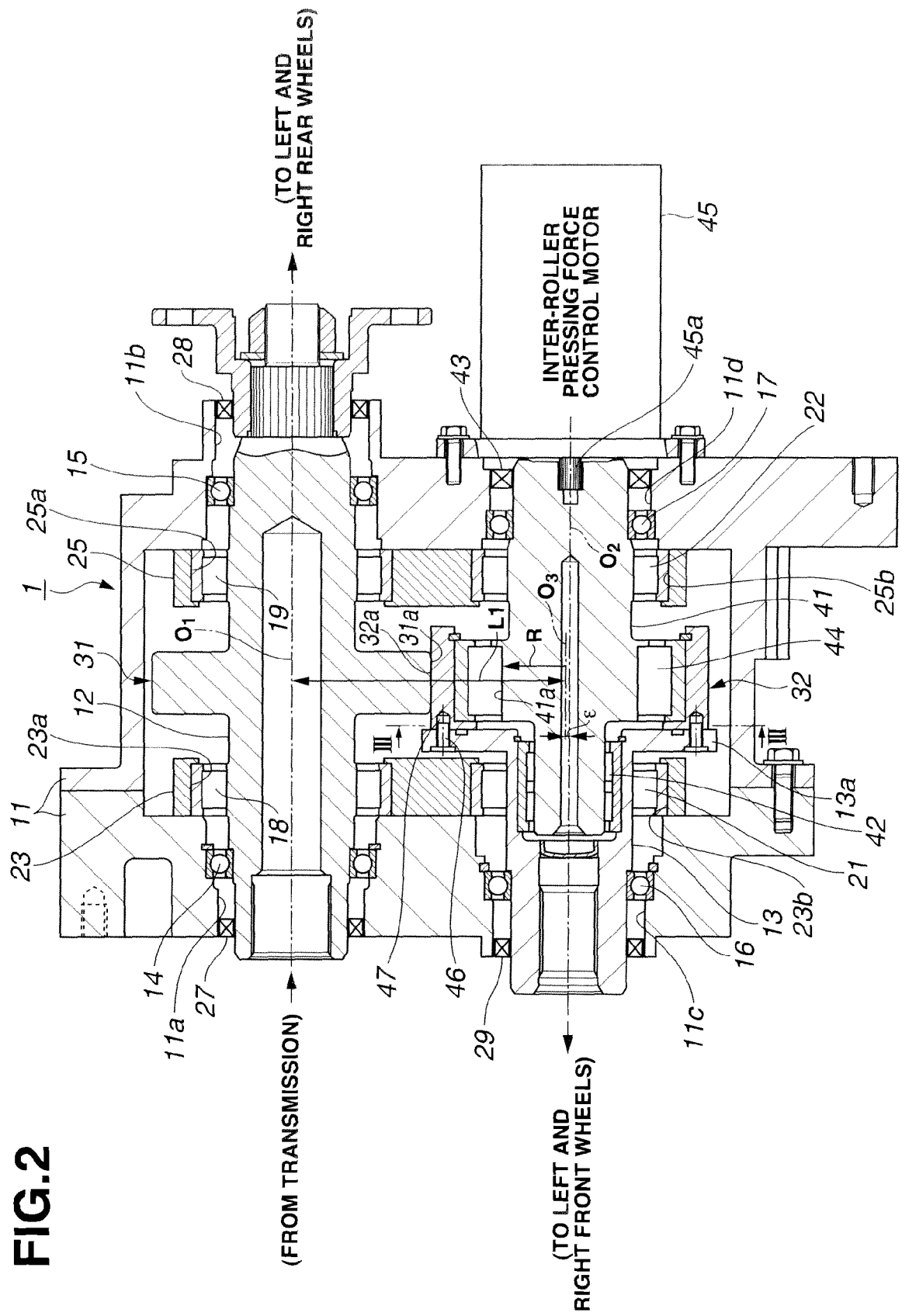
FIG. 2 is a side sectional view of the driving force distribution device (friction roller type power transmission device) of FIG. 1.

In FIG. 2, a long input shaft 12 and a shaft unit are arranged to laterally cross in a housing 11, which are parallel to one another. The shaft unit includes a short output shaft 13, and a crankshaft 41 that is arranged coaxially with output shaft 13 to face the output shaft 13 in the axial direction, and rotatably bearing-fitted to output shaft 13 through a needle bearing 42. Input shaft 12 is rotatably supported with respect to housing 11 by ball bearings 14, 15 at both ends of input shaft 12 which are inserted in shaft through holes 11a, 11b of housing 11, wherein each of ball bearings 14, 15 is provided between a respective one of the ends of input shaft 12 and a respective one of shaft through holes 11a, 11b of housing 11.

The shaft unit, which is composed of output shaft 13 and crankshaft 41, is rotatably supported with respect to housing 11 by ball bearings 16, 17 at both ends of the shaft unit which are inserted in shaft through holes 11c, 11d of housing 11, wherein each of ball bearings 16, 17 is provided between a respective one of the ends of the shaft unit and a respective one of shaft through holes 11c, 11d of housing 11.

Of input shaft 12 and the shaft unit (output shaft 13 and crankshaft 41) which are rotatably supported and arranged to laterally cross in housing 11 as described above, the input shaft 12 is provided with roller bearings 18, 19 which are disposed in housing 11 and fitted over input shaft 12, and the shaft unit 13, 41 is provided with roller bearings 21, 22 which are disposed in housing 11 and fitted over the shaft unit. Roller bearings 18, 21, and needle bearing 42, which is disposed between output shaft 13 and the bearing-fitted portion of crankshaft 41 that is coaxially arranged to face the output shaft 13 in the axial direction, are positioned substantially within a common plane perpendicular to the axial direction. Roller bearings 19, 22 are positioned within a common plane perpendicular to the axial direction, which plane is distant from roller bearings 18, 21 in the axial direction.

Roller bearings 18, 21 for input shaft 12 and output shaft 13, which are positioned substantially within a common plane together with needle bearing 42, are held in bearing-fitting portions 23a, 23b of a first bearing support 23 commonly. Bearing support 23 is fitted with a corresponding inside surface of housing 11. On the other hand, roller bearings 19, 22 for input shaft 12 and crankshaft 41, which are positioned within the second plane perpendicular to the axial direction, are held in bearing-fitting portions 25a, 25b of a second bearing support 25 commonly. Bearing support 25 is fitted with a corresponding inside surface of housing 11.

Both ends of input shaft 12 are made to extend out of housing 11, sealed liquid-tightly by seal rings 27, 28 each of which is provided between a respective one of the ends of input shaft 12 and a respective one of shaft through holes 11a, 11b of housing 11. The left end (in FIG. 2) of input shaft 12 is coupled to an output shaft of transmission 3 (see FIG. 1), and the right end (in FIG. 2) of input shaft 12 is coupled through rear propeller shaft 4 (see FIG. 1) to rear final drive unit 5. The left end (in FIG. 2) of output shaft 13 is made to extend out of housing 11, sealed liquid-tightly by a seal ring 29 that is provided between output shaft 13 and shaft through hole 11c of housing 11. The left end of output shaft 13 is coupled through front propeller shaft 7 (see FIG. 1) to front final drive unit 8.

Input shaft 12 is formed integrally with a first friction roller 31 substantially at the center of input shaft 12 in the axial direction of input shaft 12, wherein first friction roller 31 is coaxially arranged with input shaft 12. Accordingly, input shaft 12 serves as a shaft of first friction roller 31 (friction roller shaft). Crankshaft 41 includes an eccentric shaft portion 41a between bearing portions 17, 42 at both ends, where the eccentric shaft portion 41a has a semidiameter R. Eccentric shaft portion 41a has a central axis $O_3$ that is arranged with an offset of $\epsilon$ from a rotation axis $O_2$ of crankshaft 41 (output shaft 13), and is positioned in a common plane perpendicular to the axial direction together with first friction roller 31 on input shaft 12. Second friction roller 32 is rotatably attached through a roller bearing 44 to the eccentric shaft portion 41a of crankshaft 41, although the position of second friction roller 32 in the axial direction is determined. The shaft unit, which is composed of crankshaft 41 and output shaft 13, serves as a shaft of second friction roller 32 (friction roller shaft).

Accordingly, the rotation axis of second friction roller 32 is identical to the central axis $O_3$ of eccentric shaft portion 41a. By adjusting an inter-axis distance L1 between first friction roller 31 and second friction roller 32 (distance between the rotation axis $O_1$ of first friction roller 31 and rotation axis $O_3$ of second friction roller 32) by making the second friction roller rotation axis $O_3$ (the central axis of eccentric shaft portion 41a) revolve around the crankshaft rotation axis (output shaft rotation axis) $O_2$ by control of the rotational position of crankshaft 41, the radial pressing force between first friction roller 31 and second friction roller 32 (transmitted torque capacity between the first and second friction rollers) can be arbitrarily controlled.

In order to achieve an inter-friction-roller transmitted torque capacity control, the right end (in FIG. 2) of crankshaft 41 father from output shaft 13 is exposed out of housing 11, and sealed liquid-tightly by a seal ring 43 that is provided between the right end of crankshaft 41 and shaft through hole 11d of housing 11. The exposed end surface of crankshaft 41 is drivingly coupled, for example, by serration coupling, to an output shaft 45a of an inter-roller pressing force control motor 45 that is attached to housing 11.

When second friction roller 32 is pressed to first friction roller 31 in the radial direction under control of motor 45 so as to bring the outside surfaces of rollers 31, 32 into frictional contact with one another at places indicated by symbols 31a, 32a, torque can be transmitted from first friction roller 31 to second friction roller 32 through the frictional contact portions 31a, 32a. In order to allow rotation of the rotated second friction roller 32 to be transmitted to output shaft 13, output shaft 13 is formed integrally with a flange portion 13a at the inside end, and the diameter of the flange portion 13a is set so that the flange portion 13a faces the second friction roller 32 in the axial direction.

Figure 3:
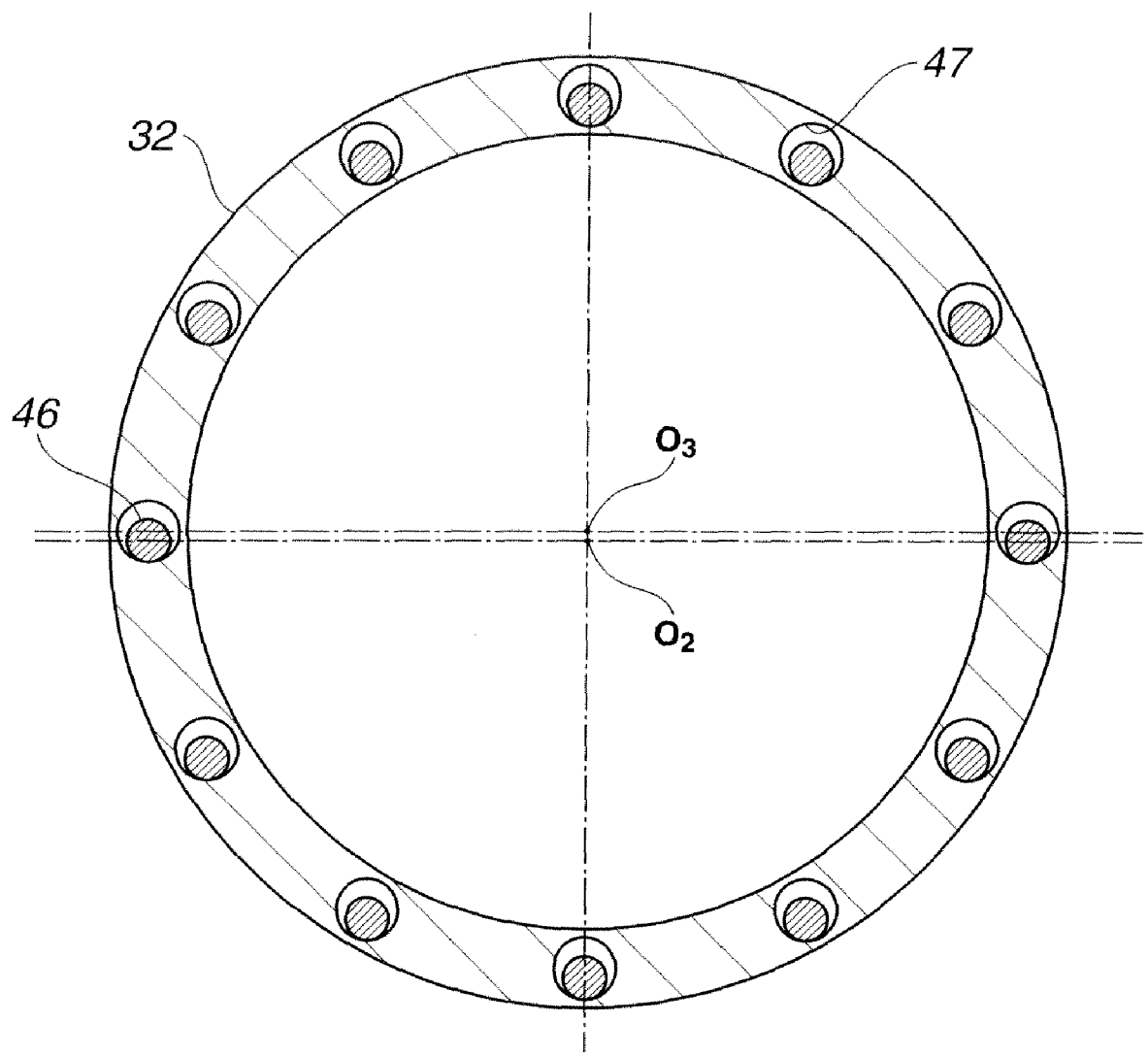
FIG. 3 is a sectional view taken along the line and viewed in the direction of an arrow in FIG. 2, showing a driving force transmitting section from a second friction is roller to an output shaft.

A plurality of driving pins 46 are fixed to the output shaft flange portion 13a that faces the second friction roller 32, where driving pins 46 project toward second friction roller 32. Driving pins 46 are arranged along a common circle at even intervals as shown in FIG. 3. The end surface of second friction roller 32 facing the output shaft flange portion 13a is formed with a plurality of holes 47 through which driving pins 46 are inserted respectively, in order to allow torque transmission from second friction roller 32 to output shaft 13 (flange portion 13a). Driving pin insertion hole 47 has the form of a circular hole having a larger diameter than the diameter of driving pin 46, as clearly shown in FIG. 3. The diameter of driving pin insertion hole 47 is set large enough to allow torque transmission from second friction roller 32 to output shaft 13 (flange portion 13a), while absorbing the eccentricity $\epsilon$ between the rotation axis $O_2$ of output shaft 13 and the rotation axis $O_3$ of second friction roller 32.

The following describes operations of friction roller type power transmission device (driving force distribution device) 1 shown in FIGS. 1 to 3. The output torque of transmission 3 is inputted to the left end (in FIG. 2) of input shaft 12. On one hand, the torque is transmitted directly from input shaft 12 through rear propeller shaft 4 and rear final drive unit 5 to left and right rear wheels 6L, 6R (main driving wheels). On the other hand, driving force distribution device (friction roller type power transmission device) 1 directs to output shaft 13 a part of torque to left and right rear wheels 6L, 6R, through first friction roller 31, frictional contact portions 31a, 32a between first friction roller 31 and second friction roller 32, second friction roller 32, driving pins 46, and output shaft flange portion 13a, and then transmits this torque to left and right front wheels (auxiliary driving wheels) 9L, 9R from the left end (in FIG. 2) of output shaft 13 through front propeller shaft 7 and front final drive unit 8. This allows four wheel driving of the vehicle wherein all of left and right rear wheels (main driving wheels) 6L, 6R and left and right front wheels (auxiliary driving wheels) 9L, 9R are driven.

When driving force distribution device (friction roller type power transmission device) 1 determines driving force distribution between left and right rear wheels (main driving wheels) 6L, 6R and left and right front wheels (auxiliary driving wheels) 9L, 9R by splitting and outputting to left and right front wheels (auxiliary driving wheels) 9L, 9R a part of torque to left and right rear wheels (main driving wheels) 6L, 6R as described above, the driving force distribution device 1 prevents the first friction roller 31 from transmitting to the second friction roller 32 a torque that is above the range of the transmitted torque capacity according to the radial pressing force between first friction roller 31 and second friction roller 32 (inter-friction-roller radial pressing force).

Accordingly, the upper limit of the torque to the left and right front wheels (auxiliary driving wheels) is set to a value corresponding to the radial pressing force between first friction roller 31 and second friction roller 32, so that the driving force distribution between left and right rear wheels (main driving wheels) 6L, 6R and left and right front wheels (auxiliary driving wheels) 9L, 9R has characteristics such that the torque to the left and right front wheels (auxiliary driving wheels) is held at the upper limit when the input torque is above a certain value.

Accordingly, even if the input torque to driving force distribution device 1 becomes large, the torque to the left and right front wheels (auxiliary driving wheels) does not exceed the upper limit described above. Therefore, driving force distribution device 1 can be used as a driving force distribution device for a four wheel drive vehicle in which the driving system of the left and right front wheels (auxiliary driving wheels) must be compact to satisfy the demand of compactness of the vehicle, wherein it is unnecessary to care about whether the strength of the driving system of the left and right front wheels (auxiliary driving wheels) is insufficient.

Moreover, in this embodiment, it is possible to adjust the inter-axis distance L1 between first friction roller 31 and second friction roller 32 by controlling the rotational position of crankshaft 41 about the axis $O_2$ by means of inter-roller pressing force control motor 45 so that the second friction roller rotation axis $O_3$ (the central axis of eccentric shaft portion 41a) revolves around the crankshaft rotation axis (output shaft rotation axis) $O_2$.

Figure 6:
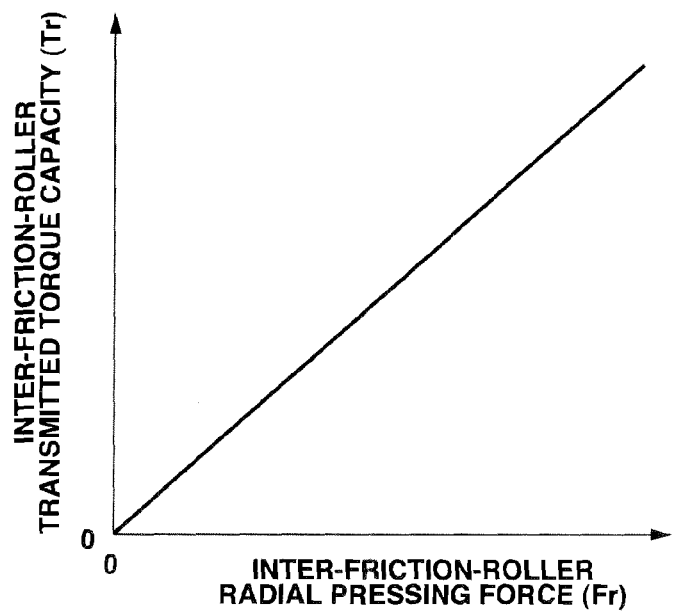
FIG. 6 is a characteristic diagram showing characteristics of change of an inter-friction-roller transmitted torque capacity with respect to an inter-friction-roller radial pressing force, for the driving force distribution device (friction roller type power transmission device) shown in FIG. 2.

The control of changing the inter-axis distance L1 between first friction roller 31 and second friction roller 32 allows control of changing the radial pressing force of second friction roller 32 to first friction roller 31, and thereby makes it possible to arbitrarily control the transmitted torque capacity between the first and second friction rollers. The inter-friction-roller transmitted torque capacity Tr changes with respect to the radial pressing force Fr between the first and second friction rollers, for example, linearly as shown in FIG. 6. Accordingly, the upper limit of the torque to the left and right front wheels (auxiliary driving wheels) can be arbitrarily changed by controlling the rotational position of crankshaft 41 with motor 45, so as to set suitable driving force distribution between left and right rear wheels 6L, 6R (main driving wheels) and left and right front wheels 9L, 9R (auxiliary driving wheels).

Moreover, in this embodiment, the friction roller shaft (output shaft) 13 related to second friction roller 32, and the friction roller shaft (input shaft) 12 related to first friction roller 31 are fitted to the first bearing support 23 through bearings 21, 18, respectively, wherein the first bearing support 23 is placed in the plane perpendicular to the axial direction, which plane contains the bearing fitting portion (needle bearing 42) where output shaft 13 drivingly coupled to second friction roller 32 and the corresponding axial end of crankshaft 41 are coaxially arranged to face one another. On the other hand, crankshaft 41 related to second friction roller 32 and the friction roller shaft (input shaft) 12 related to first friction roller 31 are fitted to the second bearing support 25 through bearings 22, 19, respectively, wherein the second bearing support 25 is placed in the plane perpendicular to the axial direction, which plane is opposed to the first bearing support 23 with respect to second friction roller 32. Accordingly, first and second bearing supports 23, 25 bear an inter-friction-roller radial pressing reaction which is caused when second friction roller 32 is pressed to first friction roller 31 in the radial direction into frictional contact with one another. This serves to cancel the inter-friction-roller radial pressing reaction within bearing supports 23, 25, and prevent the inter-friction-roller radial pressing reaction from being inputted directly to housing 11, thereby making it possible to reduce the weight of housing 11 because the strength of housing 11 does not need to be high.

Figure 4:
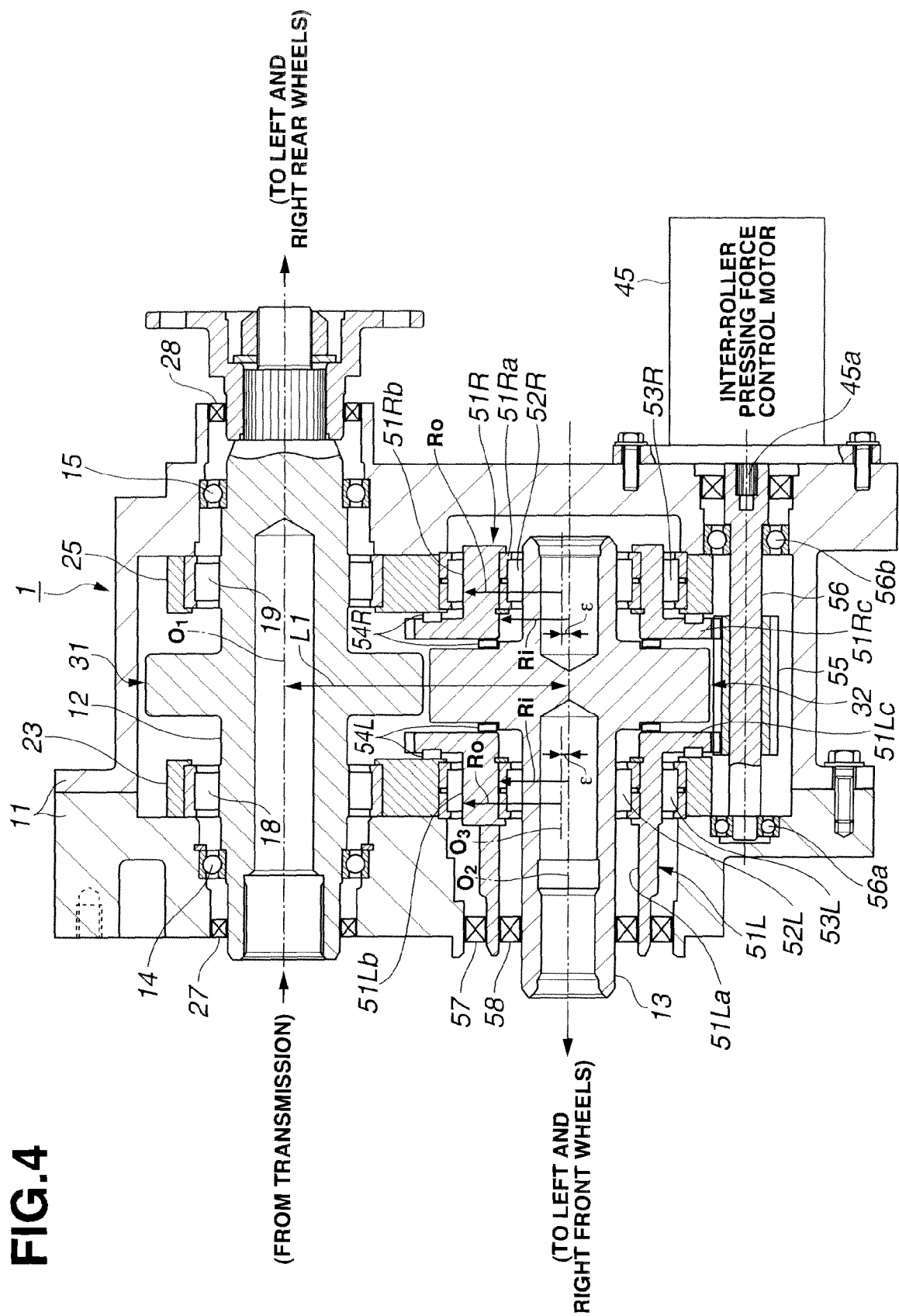
FIG. 4 is a side sectional view of another construction of the driving force distribution device of FIG. 1.
Figure 5:
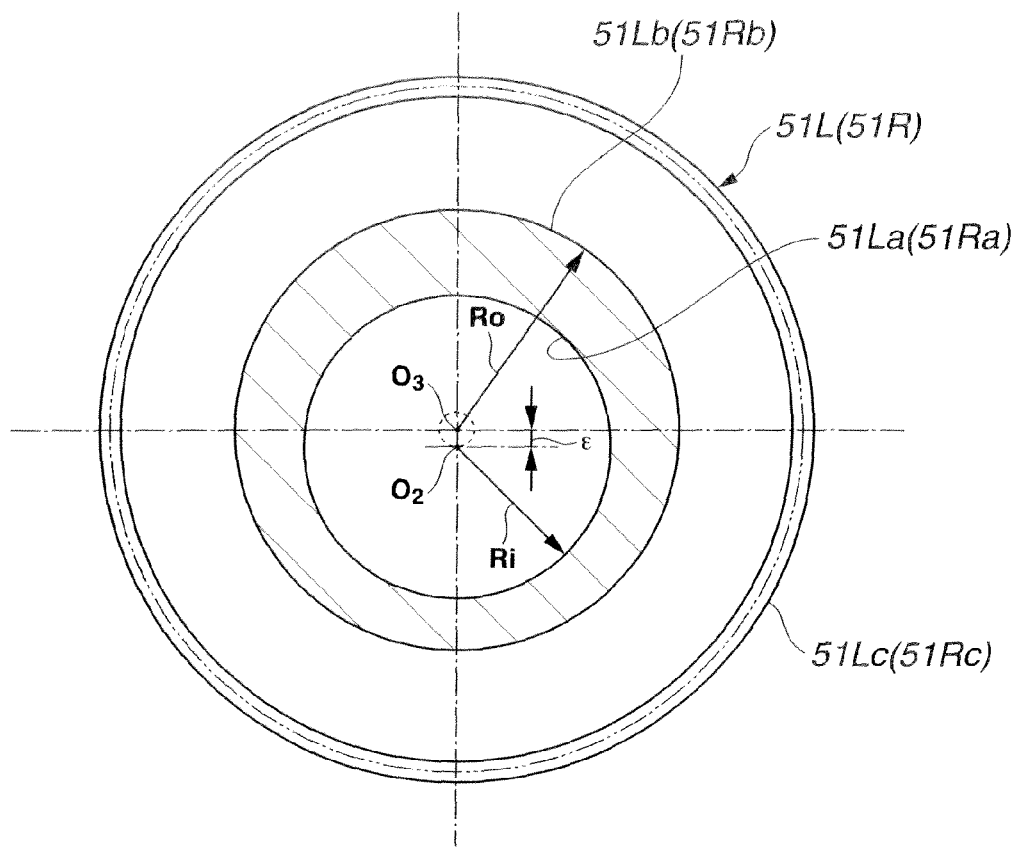
FIG. 5 is a sectional view of a crankshaft employed in the driving force distribution device shown in FIG. 4.

A friction roller type power transmission device may be constructed as shown in FIGS. 4 and 5. Specifically, crankshaft 41 in the form of a solid inner shaft is replaced with crankshafts 51L, 51R in the form of a pair of hollow outer shafts, and the radial displacement of second roller 32 is caused by rotational displacement of crankshafts 51L, 51R, to change the inter-axis distance L1 between first roller 31 and second roller 32.

Accordingly, second roller 32 is formed integrally with output shaft 13, and the hollow crankshafts 51L, 51R are located at both axial ends of second roller 32. Both ends of output shaft 13, which project from both axial ends of second roller 32, are fitted in central holes 51La, 51Ra (semidiameter Ri) of crankshafts 51L, 51R. Bearings 52L, 52R are disposed in the fitting portions so that output shaft 13 is supported in the central holes 51La, 51Ra of crankshafts 51L, 51R for free rotation about the central axis $O_2$ of the central holes 51La, 51Ra.

As clearly shown in FIG. 5, crankshafts 51L, 51R are formed with peripheries 51Lb, 51Rb (semidiameter Ro) that are eccentric with respect to central holes 51La, 51Ra (central axis $O_2$), so that the central axis $O_3$ of eccentric peripheries 51Lb, 51Rb is eccentric with respect to the central axis $O_2$ of central holes 51La, 51Ra by eccentricity $\epsilon$. Eccentric peripheries 51Lb, 51Rb of crankshafts 51L, 51R are rotatably supported in the respective bearing supports 23, 25 through bearings 53L, 53R. Crankshafts 51L, 51R as well as second friction roller 32 are positioned in the axial direction by thrust bearings 54L, 54R, respectively.

The ends of crankshafts 51L, 51R that are closer to and face one another are formed integrally with ring gears 51Lc, 51Rc having identical specifications. Ring gears 51Lc, 51Rc are meshed with a common crankshaft driving pinion 55, under condition that crankshafts 51L, 51R are in rotational positions such that the eccentric peripheries 51Lb, 51Rb are aligned with one another in the circumferential direction.

Crankshaft driving pinion 55 is coupled to a pinion shaft 56. Both ends of pinion shaft 56 are rotatably supported with respect to housing 11 by bearings 56a, 56b. The right end of pinion shaft 56 on the right side of FIG. 4 is exposed outside of housing 11. The exposed end surface of pinion shaft 56 is drivingly coupled, for example, by serration coupling, to the output shaft 45a of inter-roller pressing force control motor 45 that is attached to housing 11.

Accordingly, it is possible to arbitrarily control the radial pressing force of second friction roller 32 to first friction roller 31 (roller-transmitted torque between rollers TR) by controlling the rotational positions of crankshafts 51L, 51R through the pinion 55 and ring gears 51Lc, 51Rc by inter-roller pressing force control motor 45 so that the rotation axis $O_2$ of output shaft 13 and second friction roller 32 revolves along a locus circle indicated by a broken line in FIG. 5, and thereby the inter-axis distance L1 changes. In this way, inter-roller pressing force control motor 45, pinion 55, and crankshafts 51L, 51R as well as bearing supports 23, 25 constitute an inter-roller radial press section in the present invention.

Crankshaft 51L and output shaft 13 are made to project from housing 11 on the left side of FIG. 4. At the projecting portions, a seal ring 57 is disposed between housing 11 and crankshaft 51L, and a seal ring 58 is disposed between crankshaft 51L and output shaft 13. Seal rings 57, 58 liquid-tightly seal the projecting portions of crankshaft 51L and output shaft 13 that project from housing 11.

The center of the inside periphery and the center of the outside periphery of crankshaft 51L are set eccentric from one another at its end portion where seal rings 57, 58 are disposed, as at the portion where output shaft 13 is supported. Seal ring 57 is disposed between the outside periphery of the end portion of crankshaft 51L and housing 11, and seal ring 58 is disposed between the inside periphery of the end portion of crankshaft 51L and output shaft 13. This sealing construction makes it possible to preferably seal the place where output shaft 13 projects from housing 11, although the rotation axis $O_2$ of output shaft 13 revolves according to the revolution of output shaft 13.

The part other than the foregoing is constructed similar to the construction shown in FIGS. 2 and 3. Corresponding portions are only shown with the same symbols, without repetition of the explanation.

For the purpose described above, bearing supports 23, 25, which are provided on both sides in the axial direction of first and second friction rollers 31, 32, have high support stiffness against the inter-friction-roller radial pressing reaction. Accordingly, during the inter-friction-roller radial pressing force control (transmitted torque capacity control) by the rotation angle control of crankshaft 41, the inter-friction-roller radial pressing force Fr (or transmitted torque capacity) naturally tends to change rapidly with respect to the crankshaft rotation angle θ as indicated by a long dashed short dashed line in FIG. 7, so that the range of the crankshaft rotation angle used in the inter-friction-roller radial pressing force control (transmitted torque capacity control) is narrowly limited to θ1, which may adversely affect the accuracy of the control.

In order to solve that problem, in the embodiments shown in FIGS. 1 to 3, as shown in FIGS. 8A and 8B, bearing support 23 is provided with a constricted portion 23e at a center section between bearing-fitting portions 23a, 23b at both ends, wherein constricted portion 23e is defined by formation of thickness direction grooves 23c, 23d that extend in the direction of the central axes $O_1$, $O_2$. Namely, the width W of the center section of bearing support 23 is set below the maximum widths W1, W2 of the bearing-fitting portions. Constricted portion 23e serves to reduce the cross-sectional area of the center section of bearing support 23 between bearing-fitting portions 23a, 23b at both ends, thereby reduce the support stiffness of bearing support 23 against the inter-friction-roller radial pressing reaction, and thereby increase the amount of deformation of bearing support 23 due to the inter-friction-roller radial pressing reaction in the direction of the inter-friction-roller radial pressing reaction.

Similarly, as shown in FIGS. 8A and 8B, bearing support 25 is provided with a constricted portion 25e at a center section between bearing-fitting portions 25a, 25b at both ends, wherein constricted portion 25e is defined by formation of thickness direction grooves 25c, 25d that extend in the direction of the central axes $O_1$, $O_2$. Namely, the width W of the center section of bearing support 25 is set below the maximum widths W1, W2 of the bearing-fitting portions. Constricted portion 25e serves to reduce the cross-sectional area of the center section of bearing support 25 between bearing-fitting portions 25a, 25b at both ends, thereby reduce the support stiffness of bearing support 25 against the inter-friction-roller radial pressing reaction, and thereby increase the amount of deformation of bearing support 25 due to the inter-friction-roller radial pressing reaction in the direction of the inter-friction-roller radial pressing reaction.

Figure 7:
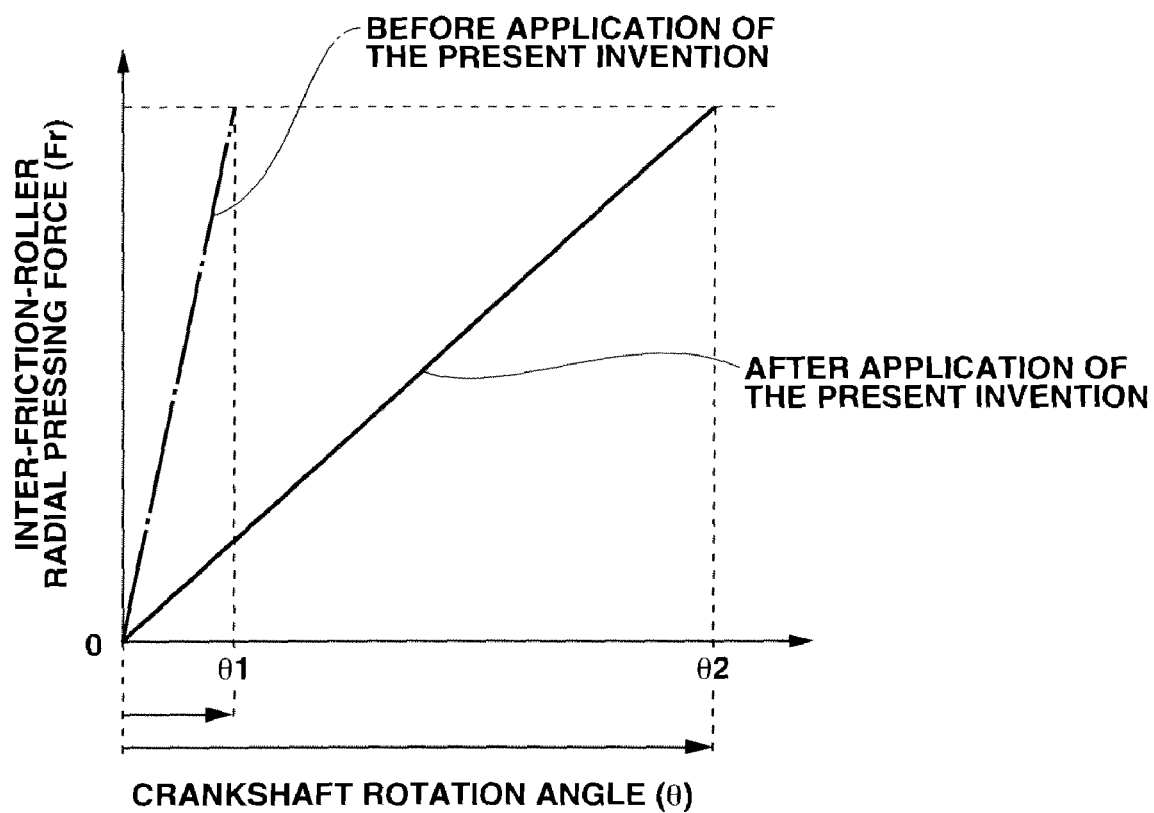
FIG. 7 is a characteristic diagram showing characteristics of change of the inter-friction-roller radial pressing force with respect to a crankshaft rotation angle for the driving force distribution device (friction roller type power transmission device) shown in FIG. 2, in comparison with characteristics of change for a case without the solution of FIG. 2.

The feature according to this embodiment that bearing support 23, 25 is provided with constricted portion 23e, 25e at the center section between bearing-fitting portions 23a, 23b at both ends or between bearing-fitting portions 25a, 25b at both ends, for lowering the support stiffness against the inter-friction-roller radial pressing reaction, serves to enhance the accuracy of the control, because the amount of deformation of bearing support 23, due to the inter-friction-roller radial pressing reaction in the direction of the inter-friction-roller radial pressing reaction is larger, and accordingly, the inter-friction-roller radial pressing force Fr (or transmitted torque capacity) changes more slowly with respect to the rotation angle θ of crankshaft 41 as indicated by a solid line in FIG. 7, so that the range of the rotation angle of crankshaft 41 used in the inter-friction-roller radial pressing force control (transmitted torque capacity control) can be extended to θ2.

Those operations and effects can be achieved also as shown in FIGS. 9A and 9B where bearing support 23, 25 is provided with a constricted portion 23h, 25h at the center section between bearing-fitting portion 23a, 25a and bearing-fitting portion 23b, 25b at both ends, wherein constricted portion 23h, 25h is defined by width direction grooves 23f, 23g, or 25f, 25g which extend in the direction to cross the plane containing the central axes $O_1$, $O_2$ of bearing-fitting portions 23a, 23b or the central axes $O_1$, $O_2$ of bearing-fitting portions 25a, 25b. Namely, the thickness T of the center section of bearing support 23, 25 is set below the maximum thicknesses T1, T2 of the bearing-fitting portions. Constricted portion 23h, 25h serves to reduce the cross-sectional area of the center section of bearing support 23, 25 between bearing-fitting portions 23a, 23b or between bearing-fitting portions 25a, 25b at both ends, thereby reduce the support stiffness of bearing support 23, 25 against the inter-friction-roller radial pressing reaction, and thereby increase the amount of deformation of bearing support 23, 25 due to the inter-friction-roller radial pressing reaction in the direction of the inter-friction-roller radial pressing reaction.

Also in the embodiment shown in FIGS. 9A and 9B where bearing support 23, 25 is provided with constricted portion 23h, 25h at the center section between bearing-fitting portions 23a, 23b at both ends or between bearing-fitting portions 25a, 25b at both ends, wherein constricted portion 23h, 25h serves to reduce the support stiffness against the inter-friction-roller radial pressing reaction, it is possible to enhance the accuracy of the control, because the amount of deformation of bearing support 23, 25 due to the inter-friction-roller radial pressing reaction in the direction of the inter-friction-roller radial pressing reaction becomes larger due to the provision of constricted portion 23h, 25h, and accordingly, the inter-friction-roller radial pressing force Fr (or transmitted torque capacity) changes more slowly with respect to the rotation angle θ of crankshaft 41 as indicated by the solid line in FIG. 7, so that the range of the rotation angle of crankshaft 41 used in the inter-friction-roller radial pressing force control (transmitted torque capacity control) can be extended to θ2.

Figure 10A:
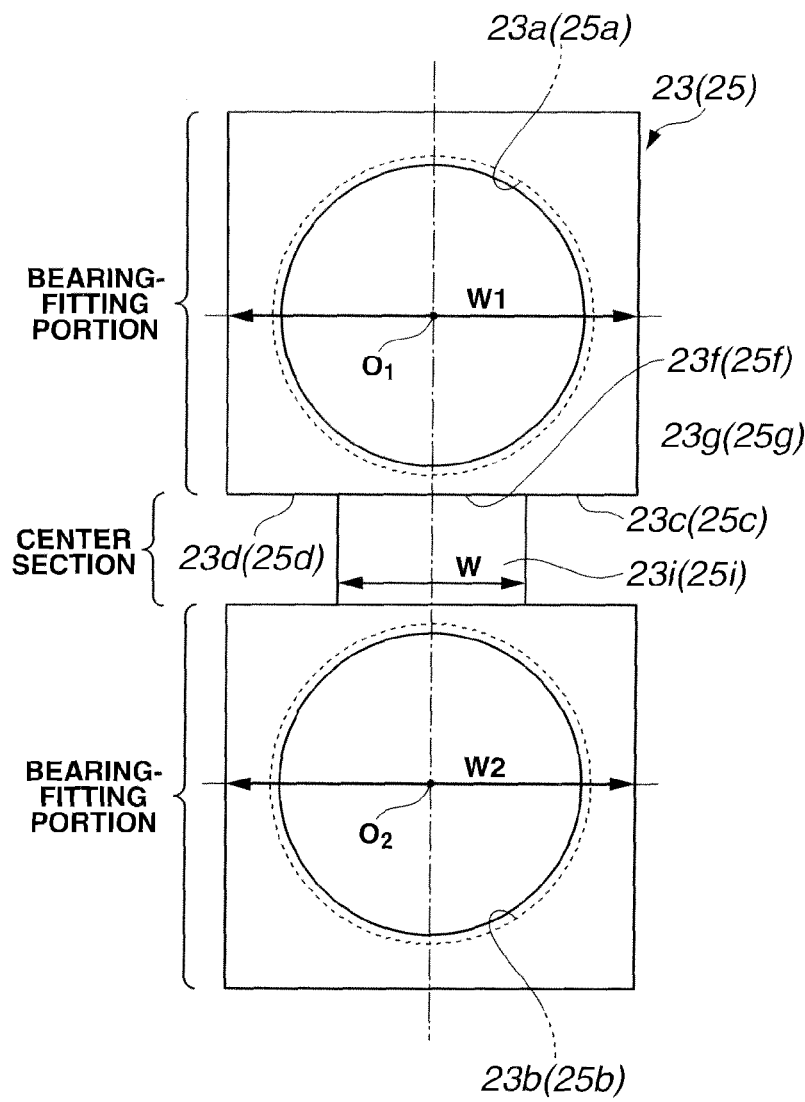
FIGS. 10A and 10B show a bearing support according to another embodiment of the present invention, similar to FIGS. 8A and 8B, where
Figure 10B:
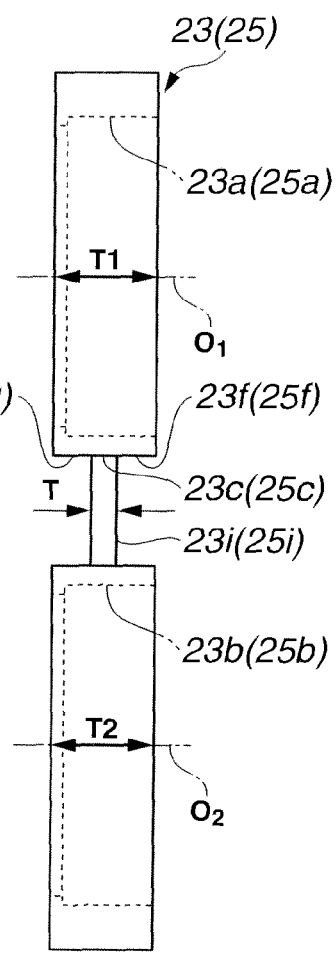

FIGS. 10A and 10B show a construction where bearing support 23, 25 is provided with a constricted portion 23i, 25i at the center section between bearing-fitting portion 23a, 25a and bearing-fitting portion 23b, 25b at both ends, wherein constricted portion 23i, 25i is defined by thickness direction grooves 23c, 23d, or 25c, 25d as in FIGS. 8A and 8B, and width direction grooves 23f, 23g, or 25f, 25g as in FIGS. 9A and 9B. Namely, the width W of the center section of bearing support 23, 25 is set below the maximum widths W1, W2 of the bearing-fitting portions, and the thickness T of the center section of bearing support 23, 25 is set below the maximum thicknesses T1, T2 of the bearing-fitting portions. Constricted portion 23i, 25i serves to reduce the cross-sectional area of the center section of bearing support 23, between bearing-fitting portions 23a, 23b or between bearing-fitting portions 25a, 25b more than in the embodiments shown in FIGS. 8A, 8B, 9A and 9B, thereby further reduce the support stiffness of bearing support 23, against the inter-friction-roller radial pressing reaction, and thereby further increase the amount of deformation of bearing support 23, 25 due to the inter-friction-roller radial pressing reaction in the direction of the inter-friction-roller radial pressing reaction.

Accordingly, in the embodiment shown in FIGS. 10A and 10B, it is possible to further enhance the accuracy of the inter-friction-roller radial pressing force control (transmitted torque capacity control), because the amount of deformation of bearing support 23, 25 due to the inter-friction-roller radial pressing reaction in the direction of the inter-friction-roller radial pressing reaction increases further, and accordingly, the range of the rotation angle of crankshaft 41 used in the inter-friction-roller radial pressing force control (transmitted torque capacity control) can be extended to a rotation angle above θ2 shown in FIG. 7.

Figure 11:
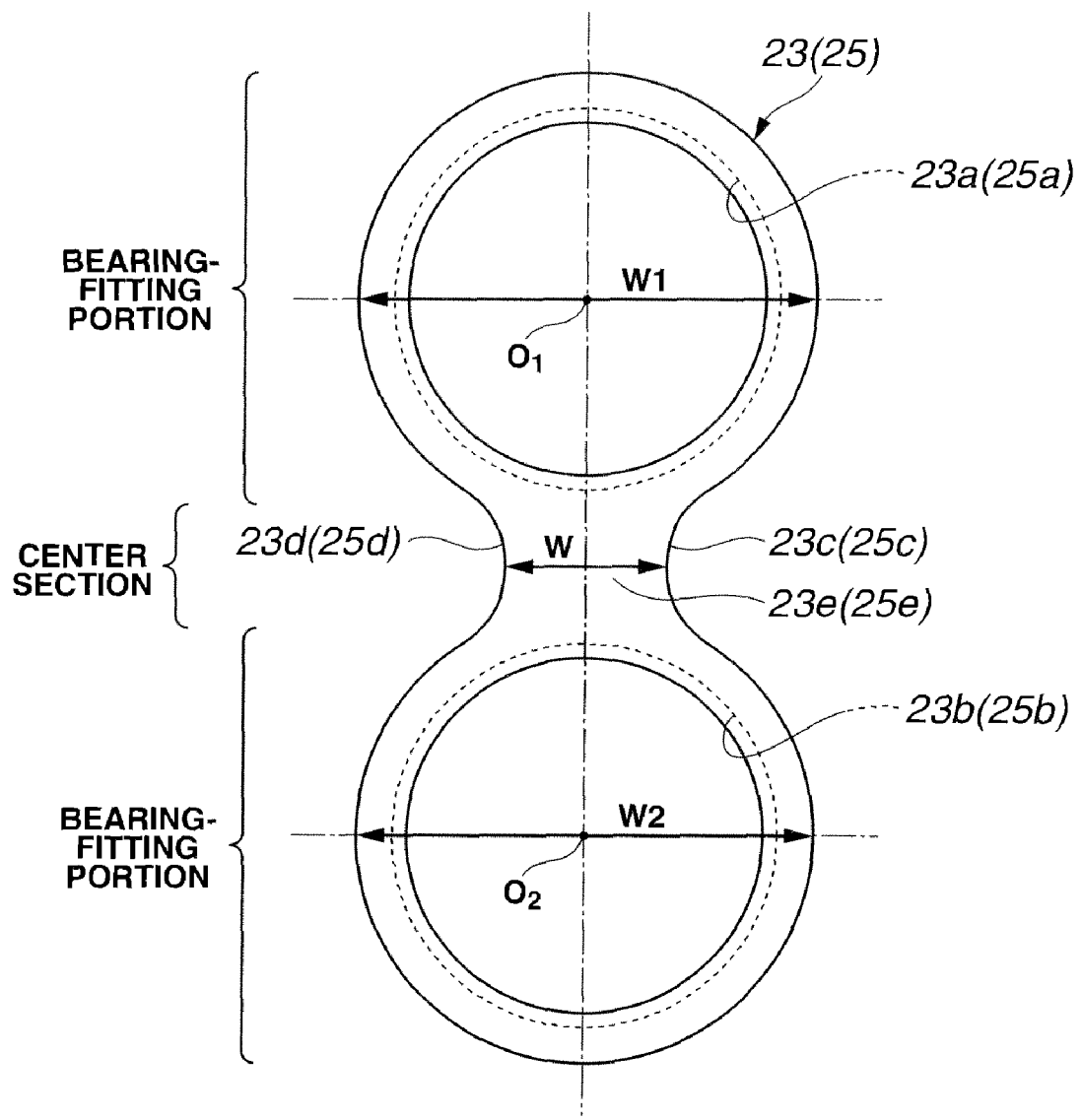
FIG. 11 is a front view of a bearing support according to another embodiment of the present invention, similar to FIG. 8A.
Figure 12:
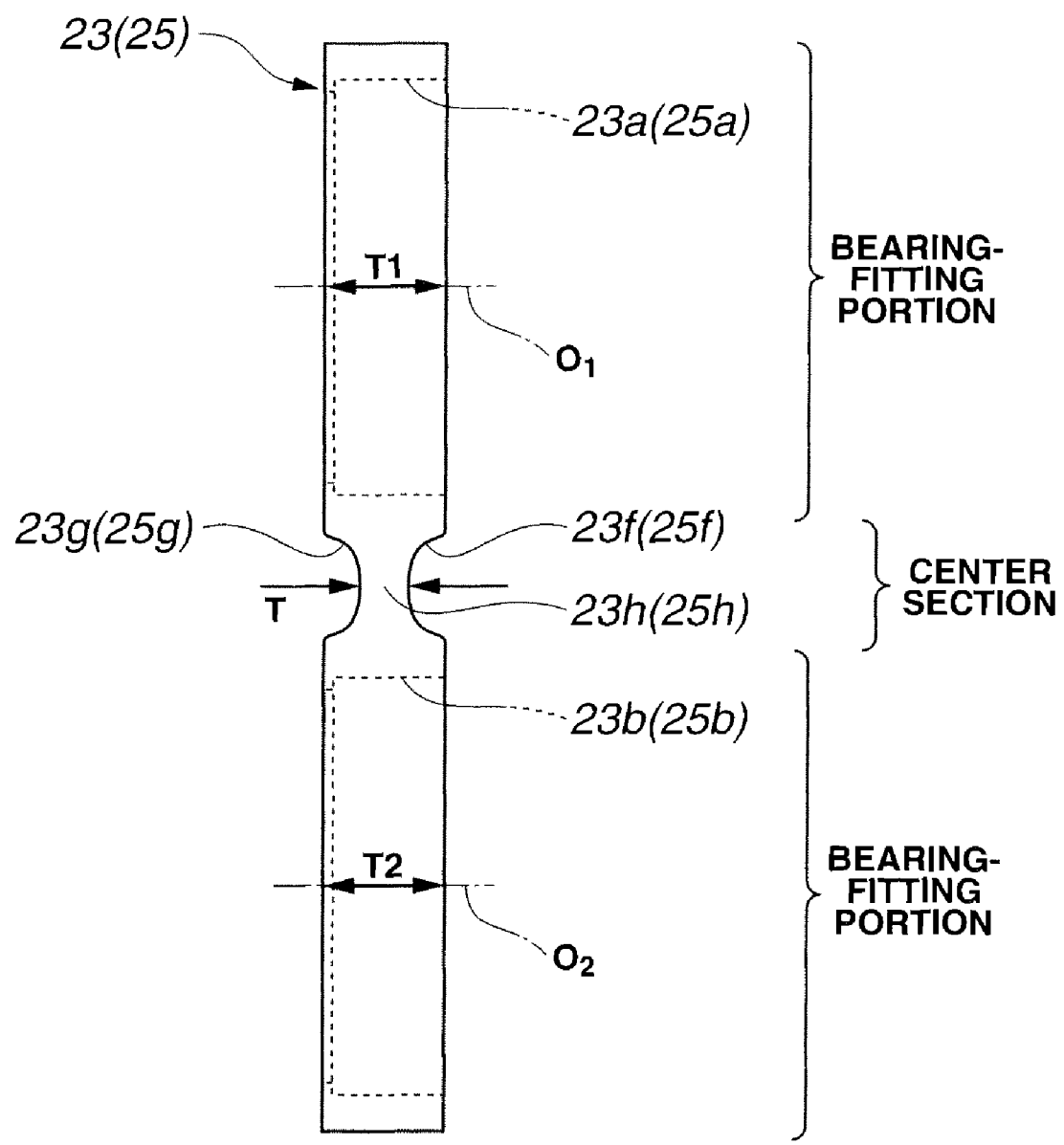
FIG. 12 is a side view of a bearing support according to another embodiment of the present invention, similar to FIG. 9B.

Each thickness direction groove 23c, 23d, or 25c, 25d of bearing support 23, 25 shown in FIGS. 8A and 8B may be modified into a shape that is smoothly continuous with circular peripheries of bearing-fitting portions 23a, 25a or 23b, 25b, wherein the curvature of the shape as viewed in the axial direction varies continuously as shown in FIG. 11. Also in FIG. 11, the thickness T of the center section of bearing support 23, 25 is set below the maximum thicknesses T1, T2 of the bearing-fitting portions. Moreover, each width direction groove 23f, 23g, or 25f, 25g of bearing support 23, 25 shown in FIGS. 9A and 9B may be modified into a shape whose bottom portion has a U-shaped cross section with no corner portion, as shown in FIG. 12. Also in FIG. 12, the thickness T of the center section of bearing support 23, 25 is set below the maximum thicknesses T1, T2 of the bearing-fitting portions. Naturally, the groove shapes shown in FIGS. 11 and 12 may be employed in combination. Such a groove shape serves to achieve the operations and effects descried above, while preventing the strength of bearing support 23, 25 from falling, because no corner portion is provided.

Incidentally, it is sufficient that the center section of each bearing support is located between the bearing-fitting portions. The center section is not limited to the central position between the rotation axes $O_1$ and $O_2$, but may be located with an offset from the central position.

The following additionally describes the control of the inter-friction-roller radial pressing force between friction rollers 31, 32. FIGS. 13A and 13B are concept diagrams of the control of the inter-friction-roller radial pressing force between friction rollers 31, 32, where FIG. 13A is a concept diagram of controlling the inter-friction-roller radial pressing force in cases where the sum of the radius R1 of friction roller 31 and the radius R2 of friction roller 32 is set equal to an inter-axis distance L0 between input shaft 12 and output shaft 13, i.e. equal to the distance L0 between the axis $O_1$ of input shaft 12 and the axis $O_2$, of output shaft 13 (crankshaft 41), and FIG. 13B is a concept diagram of controlling the inter-friction-roller radial pressing force in cases where the sum of the radius R1+α a of friction roller 31 and the radius R2+β of friction roller 32 is set larger by α+β than the inter-axis distance L0 between input shaft 12 and output shaft 13.

In cases where the sum of the radius R1 of friction roller 31 and the radius R2 of friction roller 32 is set equal to the inter-axis distance L0 between input shaft 12 and output shaft 13 as shown in FIG. 13A, second friction roller 32 comes into contact with first friction roller 31 just when the rotation angle θ of crankshaft 41 is equal to such an angle (θ=90 degrees) that second friction roller 32 is positioned as shown by a solid line. At the moment, the radial pressing force between friction rollers 31, 32 is not yet generated, and the transmitted torque capacity between friction rollers 31, 32 is equal to zero.

With crankshaft 41 rotated in the direction indicated by an arrow A1 from the rotational position described above (the crankshaft rotation angle θ increased from 90 degrees), the axis $O_3$ of second friction roller 32 moves around the crankshaft axis $O_2$ along a broken line in the corresponding direction, second friction roller 32 moves from the position indicated by the solid line to a position indicated by a broken line. In this way, the amount of overlap between first friction roller 31 and second friction roller 32 in the radial direction, δ, gradually increases from zero. As the inter-friction-roller radial overlap δ increases, the inter-friction-roller radial pressing force occurs and increases, so that the transmitted torque capacity between friction rollers 31, 32 gradually increases from zero.

With crankshaft 41 rotated so that second friction roller 32 moves to the position indicated by the broken line (crankshaft rotation angle θ set to 180 degrees), the inter-friction-roller radial overlap δ is equal to a maximum value δmax, so that the inter-friction-roller radial pressing force is maximized to maximize the transmitted torque capacity between friction rollers 31, 32. As apparent from the foregoing, the eccentricity ε from the axis $O_2$ of crankshaft 41 to the axis $O_3$ of crankshaft eccentric shaft portion 41a where second friction roller 32 is rotatably supported (the rotation axis of second friction roller 32), needs to be set equal to the maximum inter-friction-roller radial overlap δmax that is determined according to a maximum requested value of the transmitted torque capacity between friction rollers 31, 32.

On the other hand, in cases where the sum of the radius R1+α of friction roller 31 and the radius R2+β of friction roller 32 is set larger by α+β than the inter-axis distance L0 between input shaft 12 and output shaft 13 as shown in FIG. 13B, second friction roller 32 comes into contact with first friction roller 31 just when the rotation angle θ of crankshaft 41 is equal to such an angle (θ=0 degree) that second friction roller 32 is positioned as shown by a solid line. At the moment, the radial pressing force between friction rollers 31, 32 is not yet generated, and the transmitted torque capacity between friction rollers 31, 32 is equal to zero.

With crankshaft 41 rotated in the direction indicated by an arrow A2 from the rotational position described above (the crankshaft rotation angle θ increased from 0 degree), the axis $O_3$ of second friction roller 32 moves around the crankshaft central axis $O_2$ along a broken line in the corresponding direction, second friction roller 32 moves from the position indicated by the solid line to a position indicated by a broken line. In this way, the amount of overlap between first friction roller 31 and second friction roller 32 in the radial direction, δ, gradually increases from zero. As the inter-friction-roller radial overlap δ increases, the inter-friction-roller radial pressing force occurs and increases, so that the transmitted torque capacity between friction rollers 31, 32 gradually increases from zero.

With crankshaft 41 rotated so that second friction roller 32 moves to the position indicated by the broken line (crankshaft rotation angle θ set to 180 degrees), the inter-friction-roller radial overlap δ is equal to a maximum value δmax, so that the inter-friction-roller radial pressing force is maximized to maximize the transmitted torque capacity between friction rollers 31, 32.

As apparent from the foregoing, the maximum inter-friction-roller radial overlap δmax is determined by the difference in length (α+β) between the sum of the radius R1+α of friction roller 31 and the radius R2+β of friction roller 32, and the inter-axis distance L0 between input shaft 12 and output shaft 13. The difference in length (α+β) is set equal to the maximum inter-friction-roller radial overlap δmax that is determined according to a maximum requested value of the transmitted torque capacity between friction rollers 31, 32.

In contrast to the case of FIG. 13A, in the case of FIG. 13B, crankshaft 41 is rotated in a wide rage between the position of θ=0 degree and the position of θ=180 degrees for controlling the inter-friction-roller radial pressing force (inter-friction-roller transmitted torque capacity). Accordingly, it is sufficient that the eccentricity ε from the axis $O_2$ of crankshaft 41 to the axis $O_3$ of crankshaft eccentric shaft portion 41a where second friction roller 32 is rotatably supported (the rotation axis of second friction roller 32), is equal to half of the maximum inter-friction-roller radial overlap δmax that is determined according to the maximum requested value of the transmitted torque capacity between friction rollers 31, 32. The reduction in the diameter of crankshaft 41 allows to make the construction compact.

Moreover, in the construction of FIG. 13B where crankshaft 41 is rotated in a wide rage between the position of θ=0 degree and the position of θ=180 degrees for controlling the inter-friction-roller radial pressing force (inter-friction-roller transmitted torque capacity), it is possible to: allow the inter-friction-roller radial pressing force Fr (transmitted torque capacity) to change further slowly with respect to the rotation angle θ of crankshaft 41 as compared to the example shown in FIG. 7; extend the range of the rotation angle of crankshaft 41 used in the inter-friction-roller radial pressing force control (transmitted torque capacity control), to a rotation angle above θ2 shown in FIG. 7; and thereby further enhance the accuracy of the control.

Figure 14:
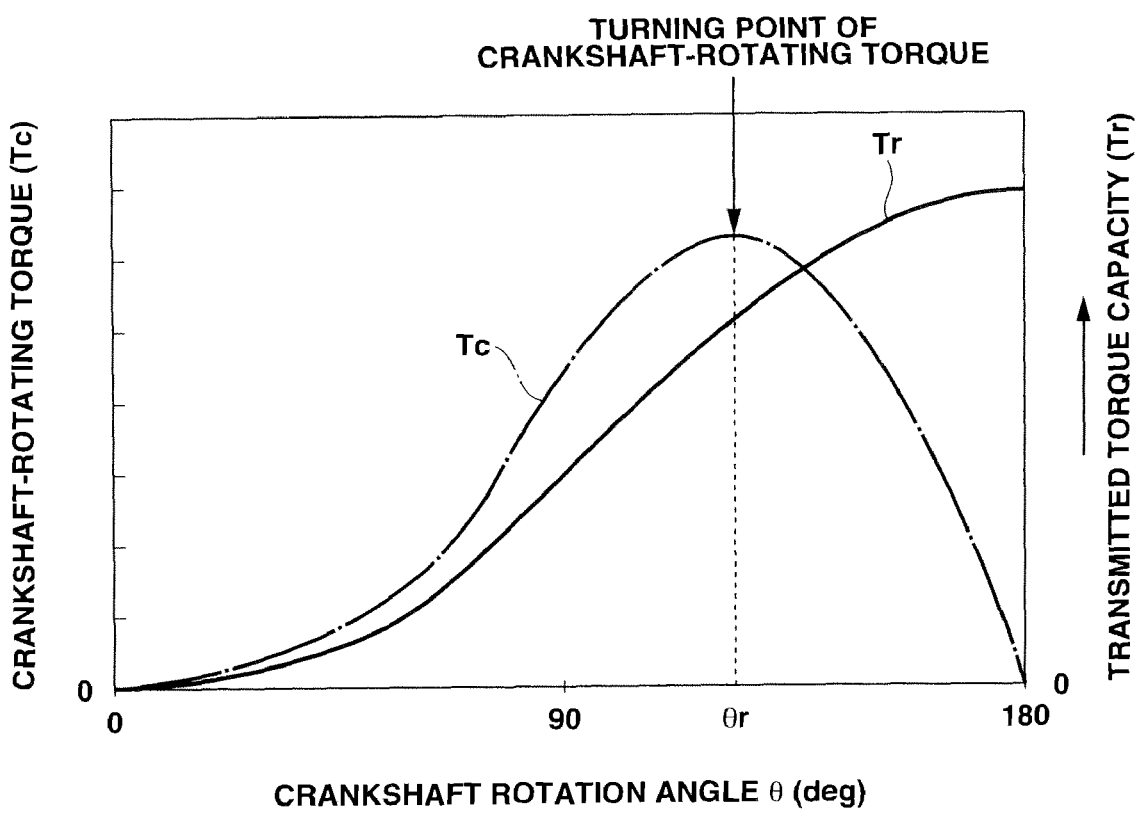
FIG. 14 is a characteristic diagram showing a relationship between crankshaft rotation angle and each of crankshaft-rotating torque and inter-friction-roller transmitted torque capacity, for the driving force distribution device (friction roller type power transmission device) shown in FIG. 2.

In either one of the case where the sum of the radiuses of friction rollers 31, 32 is set equal to the inter-axis distance L0 between the input and output shafts as shown in FIG. 13A, and the case where the sum of the radiuses of friction rollers 31, 32 is set larger than the inter-axis distance L0 between the input and output shafts as shown in FIG. 13B, a crankshaft-rotating torque Tc, which is required to rotate the crankshaft 41 in the rotation angle control, changes as indicated by a long dashed short dashed line in FIG. 14 which shows the case where the sum of the radiuses of friction rollers 31, 32 is set larger than the inter-axis distance L0 between the input and output shafts as shown in FIG. 13B. When the crankshaft rotation angle θ is equal to θr below 180 degrees (which is such an angle that the rotation axis $O_3$ of second friction roller 32 is positioned the closest to the rotation axis $O_1$ of first friction roller 31), the crankshaft-rotating torque Tc is maximized. As the crankshaft rotation angle θ exceeds θr and increases, the crankshaft-rotating torque Tc falls. Namely, the crankshaft-rotating torque Tc has a turning point (maximum point) at which the crankshaft-rotating torque Tc is maximized when the crankshaft rotation angle θ is equal to θr.

On the other hand, the transmitted torque capacity Tr between friction rollers 31, 32 increases as the rotation axis $O_3$ of second friction roller 32 approaches the rotation axis $O_1$ of first friction roller 31 (the inter-friction-roller radial overlap δ described with reference to FIGS. 13A and 13B increases). Accordingly, the transmitted torque capacity Tr monotonously increases with an increase in the crankshaft rotation angle θ also in the region of θ>θr as indicated by a solid line in FIG. 14.

In the present embodiments, in consideration of the relationship described above between the crankshaft rotation angle θ and each of the crankshaft-rotating torque Tc and inter-friction-roller transmitted torque capacity Tr, the maximum rotation angle of crankshaft 41 in the direction to increase the inter-friction-roller radial pressing force, which is used in the inter-friction-roller radial pressing force control (inter-friction-roller transmitted torque capacity control), is set larger than a crankshaft rotation angle θr as a turning point where the rate of change of the crankshaft-rotating torque Tc is reversed from positive to negative, and preferably set to 180 degrees.

In the present embodiments, the construction described above makes it possible to: allow the inter-friction-roller radial pressing force Fr (transmitted torque capacity) to change further slowly with respect to the rotation angle θ of crankshaft 41 as compared to the example shown in FIG. 7; extend the range of the rotation angle of crankshaft 41 used in the inter-friction-roller radial pressing force control (transmitted torque capacity control), to a rotation angle above θ2 shown in FIG. 7; and thereby further enhance the accuracy of the control. In addition, it is possible to allow the inter-friction-roller transmitted torque capacity Tr to increase in the range where the crankshaft rotation angle θ increases above θr, while the crankshaft-rotating torque Tc decreases. This produces an advantageous effect of increasing the inter-friction-roller transmitted torque capacity Tr while suppressing the driving load of the inter-roller pressing force control motor 45 (see FIG. 2).

The foregoing describes the cases where in the friction roller type power transmission device (driving force distribution device) 1, first and second friction rollers 31, 32 are adapted to be in direct frictional contact with one another at frictional contact portions 31a, 32a. Naturally, the concept of the present invention described above can be applied to friction roller type power transmission devices where first and second friction rollers 31, 32 are adapted to be in indirect frictional contact with one another through an idler roller. Such a case produces similar operations and effects as described above.

The invention claimed is:

1. A friction roller type power transmission device configured to allow power transmission between a pair of friction rollers by pressing the friction rollers against one another in a radial direction of the friction rollers into frictional contact with one another in one of a direct manner and an indirect manner, wherein:
   one of the friction rollers is supported for rotation about an eccentric axis with respect to a crankshaft whose rotational position is adapted to be controlled to adjust a radial pressing force between the friction rollers;
   each side of the friction rollers in an axial direction of the friction rollers is provided with a bearing support to which the crankshaft related to the one of the friction rollers, and a friction roller shaft related to another of the friction rollers are bearing-fitted, so that the bearing supports bear a radial pressing force reaction between the friction rollers; and
   each bearing support is formed with a constricted portion at a center section of the bearing support between bearing-fitting portions at end sections of the bearing support, for lowering support stiffness of the bearing support against the radial pressing reaction between the friction rollers.

2. The friction roller type power transmission device as claimed in claim 1, wherein the constricted portion is defined by a thickness direction groove formed in the center section, wherein the thickness direction groove extends in a direction of central axes of the bearing-fitting portions.

3. The friction roller type power transmission device as claimed in claim 1, wherein the constricted portion is defined by a width direction groove formed in the center section, wherein the width direction groove extends in a direction to cross a plane containing the central axes of the bearing-fitting portions.

4. The friction roller type power transmission device as claimed in claim 1, wherein:
   the friction rollers are pressed against one another in the radial direction into frictional contact with one another in the direct manner; and
   a sum of radiuses of the friction rollers is set greater than an inter-axis distance between the crankshaft related to the one of the friction rollers, and the friction roller shaft related to the other of the friction rollers.

5. The friction roller type power transmission device as claimed in claim 1, wherein a maximum rotation angle of the crankshaft in a direction to increase the radial pressing force between the friction rollers which is used in control of the radial pressing force between the friction rollers is set greater than a rotation angle of the crankshaft at a turning point where a rate of change of a crankshaft-rotating torque required to rotate the crankshaft is reversed.

6. A friction roller type power transmission device comprising:
   a first friction roller having a rotation axis in a first direction;
   a second friction roller arranged to allow frictional torque transmission with the first friction roller, and positioned in a second direction from the rotation axis of the first friction roller, the second friction roller having a rotation axis substantially parallel to the first direction;
   a crankshaft that supports the second friction roller so as to allow the second friction roller to rotate about an eccentric axis, and changes a radial pressing force between the first and second friction rollers by rotation; and
   a bearing support including:
      a first bearing-fitting portion pivotally supporting the first friction roller;
      a second bearing-fitting portion pivotally supporting the crankshaft; and
      a center section between the first and second bearing-fitting portions, the center section having a smaller size in a direction perpendicular to the first and second directions than the first and second bearing-fitting portions.

7. The friction roller type power transmission device as claimed in claim 6, wherein:
   the first and second friction rollers transmit torque in direct contact with one another; and
   a sum of radiuses of the first and second friction rollers is greater than a distance between a rotation axis of the crankshaft and the rotation axis of the first friction roller.

8. The friction roller type power transmission device as claimed in claim 6, wherein torque required to rotate the crankshaft has a turning point between both ends of a controlled rotation range of the crankshaft, at which turning point a rate of change of the torque is reversed.

9. A friction roller type power transmission device comprising:
   a first friction roller having a rotation axis in a first direction;
   a second friction roller arranged to allow frictional torque transmission with the first friction roller, the second friction roller having a rotation axis substantially parallel to the first direction;
   a crankshaft that supports the second friction roller so as to allow the second friction roller to rotate about an eccentric axis, and changes a radial pressing force between the first and second friction rollers by rotation; and a bearing support including:
- a first bearing-fitting portion pivotally supporting the first friction roller;
- a second bearing-fitting portion pivotally supporting the crankshaft; and
- a center section between the first and second bearing-fitting portions, the center section having a smaller size in the first direction than the first and second bearing-fitting portions.

10. The friction roller type power transmission device as claimed in claim 9, wherein:

the first and second friction rollers transmit torque in direct contact with one another; and a sum of radiuses of the first and second friction rollers is greater than a distance between a rotation axis of the crankshaft and the rotation axis of the first friction roller.

11. The friction roller type power transmission device as claimed in claim 9, wherein torque required to rotate the crankshaft has a turning point between both ends of a controlled rotation range of the crankshaft, at which turning point a rate of change of the torque is reversed.

* * * * *